(12) United States Patent
Hayama

(10) Patent No.: US 10,901,412 B2
(45) Date of Patent: Jan. 26, 2021

(54) MOVING BODY, CONTROL METHOD, AND RECORDING MEDIUM

(71) Applicant: Panasonic Intellectual Property Corporation of America, Torrance, CA (US)

(72) Inventor: Satoru Hayama, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 197 days.

(21) Appl. No.: 15/995,170

(22) Filed: Jun. 1, 2018

(65) Prior Publication Data
    US 2019/0049947 A1    Feb. 14, 2019

(30) Foreign Application Priority Data
    Aug. 10, 2017 (JP) .................. 2017-154988

(51) Int. Cl.
    *G05D 1/00*   (2006.01)
    *B64C 39/02*  (2006.01)
    *G08G 5/00*   (2006.01)

(52) U.S. Cl.
    CPC ......... *G05D 1/0033* (2013.01); *B64C 39/024* (2013.01); *G08G 5/0013* (2013.01); *G08G 5/0069* (2013.01); *B64C 2201/123* (2013.01); *B64C 2201/146* (2013.01)

(58) Field of Classification Search
    CPC .... G05D 1/0033; G05D 1/101; G08G 5/0013; G08G 5/0069; B64C 39/024; B64C 2201/146; B64C 2201/123; B64C 2201/14
    USPC .......................................................... 701/3
    See application file for complete search history.

(56) References Cited

U.S. PATENT DOCUMENTS

| | | | |
|---|---|---|---|
| 9,588,516 B1* | 3/2017 | Gurel | G05D 1/0033 |
| 2018/0312274 A1* | 11/2018 | Kessler | G08G 5/0091 |
| 2019/0176967 A1* | 6/2019 | Ohata | B64C 39/024 |

FOREIGN PATENT DOCUMENTS

JP    2004-101616    4/2004

* cited by examiner

*Primary Examiner* — Nadeem Odeh
(74) *Attorney, Agent, or Firm* — Greenblum & Bernstein, P.L.C.

(57) ABSTRACT

A moving body includes a drive that causes the moving body to move, a light emitter that emits light, and a receiver that receives response information indicating that an operator who operates the moving body, an observer who observes the moving body, or a supervisor who supervises the moving body sees the light. The moving body also includes a detector that detects a position of the moving body, a recorder that records the position of the moving body, and a controller that, when the receiver receives the response information within a fixed time since the light emitter emitted the light, causes the recorder to record the detected position of the moving body, and when the receiver does not receive the response information within the fixed time, outputs to the drive a control command that causes the moving body to move to the last recorded position.

19 Claims, 8 Drawing Sheets

MOVING BODY, CONTROL METHOD, AND RECORDING MEDIUM

BACKGROUND

1. Technical Field

The present disclosure relates to a moving body that moves in visual range of a person or the like, as well as a control method and a recording medium for the moving body.

2. Description of the Related Art

Recently, to achieve appropriate operation and management of moving bodies, various countries are beginning to introduce regulations that permit a moving body to be remote-controlled only in cases in which the operator is able to see the moving body being operated. The introduction of such regulations is accelerating for one type of moving body in particular, namely unmanned air vehicles, also referred to as drones. To carry out such regulations, it is effective to have technology that disables operations such as remote control and autopilot in cases in which the operator is unable to see the moving body being operated.

For example, as a technology of the related art regarding a movement control method of a moving body for controlling movement by confirming a person using visible light rays, Japanese Patent No. 4284949 discloses a movement imaging system including a movable moving body provided with an on-board imaging apparatus, and a signal generating apparatus which is attached to an imaging subject and which produces a light signal formed by a blinking pattern of light. The imaging apparatus includes an imaging section, and a processing section that repeatedly switches, in a time-division manner, between an image mode that acquires image data as a scene from a signal obtained by the imaging section, and an ID mode that receives the light signal by reconstructing the blinking pattern from the signal obtained by the imaging section.

SUMMARY

However, in the above configuration of the related art, further improvement is demanded.

In one general aspect, the techniques disclosed here feature a moving body comprising: a drive that causes the moving body to move; a light emitter that emits light; a receiver that receives response information indicating that an operator who operates the moving body, an observer who observes the moving body, or a supervisor who supervises the moving body sees the light; a detector that detects a position of the moving body; a recorder that records the position of the moving body; and a controller that, in a case in which the receiver receives the response information within a fixed amount of time since the light emitter emitted the light, causes the recorder to record the position of the moving body detected by the detector, and in a case in which the receiver does not receive the response information within the fixed amount of time, outputs to the drive a control command that causes the moving body to move to the last position recorded by the recorder.

These general and specific aspects may be implemented using a system, a method, and a computer program, and any combination of systems, methods, and computer programs.

According to the present disclosure, a moving body may be operated only in the case in which the moving body is being seen by a person or the like.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
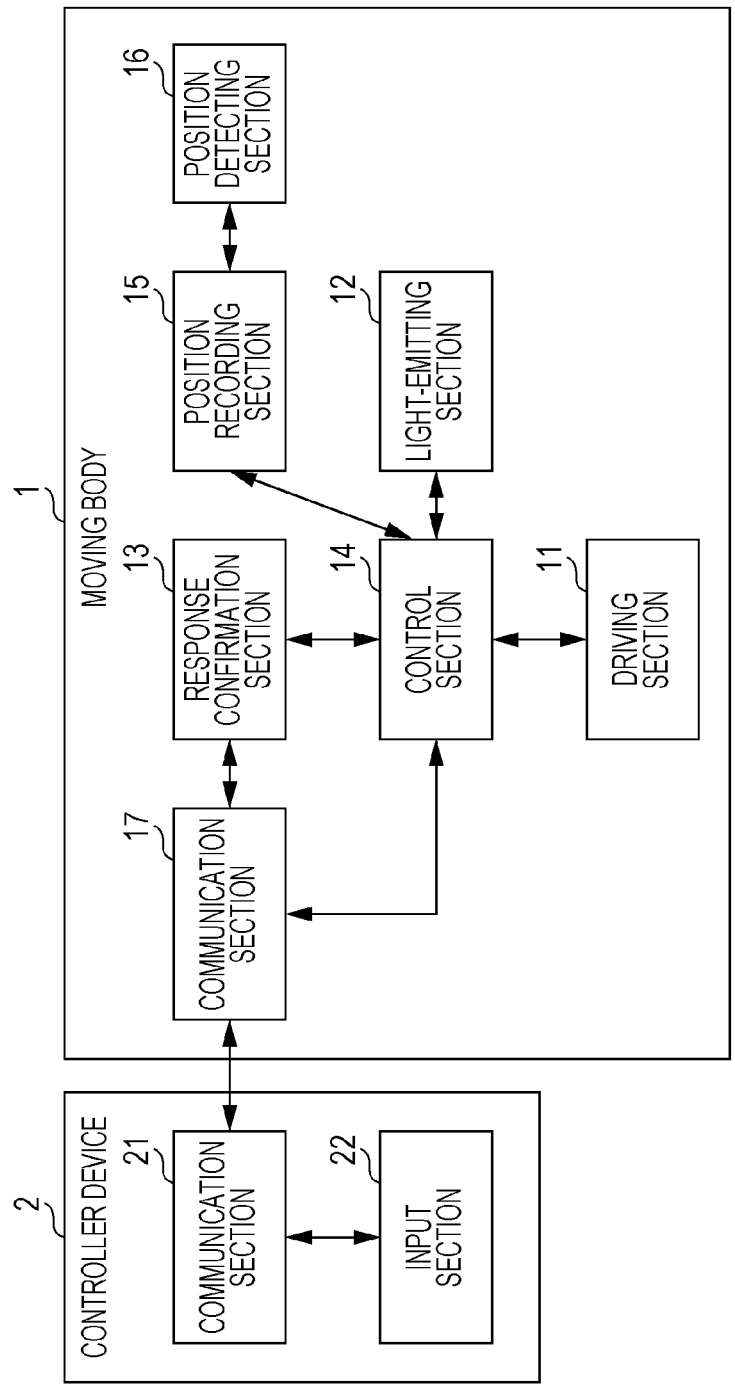
FIG. 1 is a block diagram illustrating an example of the configuration of a moving body and a controller device according to Embodiment 1 of the present disclosure.

DETAILED DESCRIPTION (Underlying Knowledge Forming Basis of the Present Disclosure)

As above, Japanese Patent No. 4284949 discloses a technology in which a person wears the signal generating apparatus that generates a light signal on one's own body, an image is captured by the imaging apparatus provided on-board the moving body, and by detecting the light signal from the captured image, the movement of the moving body is controlled.

However, with the technology disclosed in Japanese Patent No. 4284949, the motion of the moving body cannot be changed on the basis of whether or not the moving body is seen from the side of the person, and operations such as remote control and autopilot cannot be disabled in cases in which the operator is unable to see the moving body being operated.

To address such issues, a moving body according to one aspect of the present disclosure is a moving body comprising: a drive that causes the moving body to move; a light emitter that emits light; a receiver that receives response information indicating that an operator who operates the moving body, an observer who observes the moving body, or a supervisor who supervises the moving body sees the light; a detector that detects a position of the moving body; a recorder that records the position of the moving body; and a controller that, in a case in which the receiver receives the response information within a fixed amount of time since the light emitter emitted the light, causes the recorder to record the position of the moving body detected by the detector, and in a case in which the receiver does not receive the response information within the fixed amount of time, outputs to the drive a control command that causes the moving body to move to the last position recorded by the recorder.

According to this configuration, in the case in which the person or the like is able to see light, and response information indicating that the light is seen is generated within a fixed amount of time since the light was emitted by the light emitter, the receiver is able to receive the response information, and the controller causes the recorder to record the position of the moving body detected by the detector. At this time, the controller does not output to the drive the control command for causing the moving body to move to the last position recorded by the recorder, and thus operations such as remote control by the person or the like and autopilot become possible.

On the other hand, in the case in which the person or the like is unable to see the light, and response information indicating that the light is seen is not generated within a fixed amount of time since the light was emitted by the light emitter, the receiver is unable to receive the response information, and the controller outputs to the drive the control command for causing the moving body to move to the last position recorded by the recorder. For this reason, the moving body is forcibly returned to the last position where the person or the like was able to see the light emitted by the light emitter, and until the moving body returns to that position, operations such as remote control by the person or the like and autopilot may be disabled. Consequently, the moving body may be operated only in the case in which the moving body is seen by the person or the like.

A configuration is also possible in which the receiver determines that the response information is received in a case of receiving a response signal transmitted from a controller device for remotely operating the moving body, and the response signal is a signal that the operator transmits using the controller device in a case in which the operator who operates the controller device sees the light.

According to this configuration, in the case in which the operator is able to see light, and a response signal indicating that the light is seen is transmitted from the controller device within a fixed amount of time since the light was emitted by the light emitter, the receiver is able to determine that response information has been received, and the controller causes the recorder to record the position of the moving body detected by the detector and does not output to the drive the control command for causing the moving body to move to the last position recorded by the recorder. Thus, operations such as remote control by the operator and autopilot become possible.

On the other hand, in the case in which the operator is unable to see the light, and the response signal indicating that the light is seen is not transmitted from the controller device within a fixed amount of time since the light was emitted by the light emitter, the receiver determines that the response information has not been received, and the controller outputs to the drive the control command for causing the moving body to move to the last position recorded by the recorder. For this reason, the moving body is forcibly returned to the last position where the operator was able to see the light emitted by the light emitter, and until the moving body returns to that position, operations such as remote control by the operator and autopilot may be disabled. Consequently, the moving body may be operated only in the case in which the moving body is seen by the operator.

A configuration is also possible in which the light emitter causes the light to be emitted in at least one light emission pattern selected from among a plurality of light emission patterns, and the response signal is transmitted from the controller device in a case in which the operator operates the controller device by a predetermined operation associated with the at least one light emission pattern.

According to this configuration, light is emitted in at least one light emission pattern selected from among multiple light emission patterns, and the receiver determines that response information has been received only in the case in which the operator is able to see the light emitted in the light emission pattern, and a response signal indicating that the light is seen is transmitted from the controller device by a predetermined operation associated with the light emission pattern. For this reason, in the case in which the operator does not perform the appropriate operation associated with the above light emission pattern, the receiver determines that response information has not been received. Consequently, operations such as remote control by the operator and autopilot become possible only in the case in which the operator definitely sees the moving body, whereas operations such as remote control by the operator and autopilot may be disabled in the case in which the operator does not definitely see the moving body.

A configuration is also possible in which the light emitter causes the light to be emitted in at least one light emission pattern selected from among a plurality of light emission patterns, and the controller device transmits a response signal associated with the at least one light emission pattern, in accordance with a predetermined operation associated with the at least one light emission pattern by the operator, and the receiver determines that the response information is received only in a case of receiving the response signal associated with the at least one light emission pattern emitted by the light emitter.

According to this configuration, light is emitted in at least one light emission pattern selected from among multiple light emission patterns, the controller device transmits a response signal associated with the at least one light emission pattern in accordance with a predetermined operation associated with the at least one light emission pattern by the operator, and the receiver determines that response information has been received only in the case of receiving the response signal associated with the at least one light emission pattern emitted by the light emitter. For this reason, in the case in which the operator does not perform the appropriate operation associated with the above light emission pattern, the receiver determines that response information has not been received. Consequently, operations such as remote control by the operator and autopilot become possible only in the case in which the operator definitely sees the moving body, whereas operations such as remote control by the operator and autopilot may be disabled in the case in which the operator does not definitely see the moving body.

A configuration is also possible in which the receiver determines that the response information is received in a case of receiving a response signal transmitted from an observation apparatus for observing the moving body, and the response signal is a signal that the observer transmits using the observation apparatus in a case in which the observer who operates the observation apparatus sees the light.

According to this configuration, in the case in which the observer is able to see light, and a response signal indicating that the light is seen is transmitted from the observation apparatus within a fixed amount of time since the light was emitted by the light emitter, the receiver is able to determine that response information has been received, and the controller causes the recorder to record the position of the moving body detected by the detector and does not output to the drive the control command for causing the moving body to move to the last position recorded by the recorder. Thus, in the case in which the observer is able to see the moving body, operations such as remote control by the operator and autopilot or the like become possible.

On the other hand, in the case in which the observer is unable to see the light and the response signal indicating that the light is seen is not transmitted from the observation apparatus within a fixed amount of time since the light was emitted by the light emitter, the receiver determines that the response information has not been received, and the controller outputs to the drive the control command for causing the moving body to move to the last position recorded by the recorder. For this reason, the moving body is forcibly returned to the last position where the observer was able to see the light emitted by the light emitter, and until the moving body returns to that position, operations such as remote control by the operator or the like and autopilot may be disabled. Consequently, the moving body may be operated only in the case in which the moving body is seen by the observer.

A configuration is also possible in which the light emitter causes the light to be emitted in at least one light emission pattern selected from among a plurality of light emission patterns, and the response signal is transmitted from the observation apparatus in a case in which the observer operates the observation apparatus by a predetermined operation associated with the at least one light emission pattern.

According to this configuration, light is emitted in at least one light emission pattern selected from among multiple light emission patterns, and the receiver determines that response information has been received only in the case in which the observer is able to see the light emitted in the light emission pattern, and a response signal indicating that the light is seen is transmitted from the observation apparatus by a predetermined operation associated with the light emission pattern. For this reason, in the case in which the observer does not perform the appropriate operation associated with the above light emission pattern, the receiver determines that response information has not been received. Consequently, operations such as remote control by the operator or the like and autopilot become possible only in the case in which the observer definitely sees the moving body, whereas operations such as remote control by the operator or the like and autopilot may be disabled in the case in which the observer does not definitely see the moving body.

A configuration is also possible in which the light emitter causes the light to be emitted in at least one light emission pattern selected from among a plurality of light emission patterns, and the observation apparatus transmits a response signal associated with the at least one light emission pattern, in accordance with a predetermined operation associated with the at least one light emission pattern by the observer, and the receiver determines that the response information is received only in a case of receiving the response signal associated with the at least one light emission pattern emitted by the light emitter.

According to this configuration, light is emitted in at least one light emission pattern selected from among multiple light emission patterns, the observation apparatus transmits a response signal associated with the at least one light emission pattern in accordance with a predetermined operation associated with the at least one light emission pattern by the observer, and the receiver determines that response information has been received only in the case of receiving the response signal associated with the at least one light emission pattern emitted by the light emitter. For this reason, in the case in which the observer does not perform the appropriate operation associated with the above light emission pattern, the receiver determines that response information has not been received. Consequently, operations such as remote control by the operator or the like and autopilot become possible only in the case in which the observer definitely sees the moving body, whereas operations such as remote control by the operator or the like and autopilot may be disabled in the case in which the observer does not definitely see the moving body.

A configuration is also possible in which the moving body further comprises an imager that captures an image of a supervisor who supervises the moving body, wherein the receiver determines that the response information is received in a case of acquiring, from the imager, image data in which the supervisor makes a predetermined gesture indicating that the light is seen.

According to this configuration, the imager images the supervisor who supervises the moving body, and the receiver determines that response information has been received in the case in which image data of the supervisor making a predetermined gesture indicating that the light is seen is acquired from the imager. For this reason, in the case in which the supervisor is able to see the light and makes a predetermined gesture indicating that the light is seen within a fixed amount of time since the light was emitted by the light emitter, the receiver is able to determine that response information has been received, and the controller causes the recorder to record the position of the moving body detected by the detector and does not output to the drive the control command for causing the moving body to move to the last position recorded by the recorder. Thus, in the case in which the supervisor is able to see the moving body, operations such as remote control by the operator or the like and autopilot become possible.

On the other hand, in the case in which the supervisor is unable to see the light and does not make a predetermined gesture indicating that the light is seen within a fixed amount of time since the light was emitted by the light emitter, the receiver determines that the response information has not been received, and the controller outputs to the drive the control command for causing the moving body to move to the last position recorded by the recorder. For this reason, the moving body is forcibly returned to the last position where the supervisor was able to see the light emitted by the light emitter, and until the moving body returns to that position, operations such as remote control by the operator or the like and autopilot may be disabled. Consequently, the moving body may be operated only in the case in which the moving body is seen by the supervisor.

A configuration is also possible in which the light emitter causes the light to be emitted in at least one light emission pattern selected from among a plurality of light emission patterns, and the receiver determines that the response information is received in a case of acquiring, from the imager, image data in which the supervisor makes a predetermined gesture associated with the at least one light emission pattern.

According to this configuration, light is emitted in at least one light emission pattern selected from among multiple light emission patterns, and the receiver determines that response information has been received only in the case in which the supervisor is able to see the light emitted in the light emission pattern and makes a predetermined gesture associated with the light emission pattern. For this reason, in the case in which the supervisor does not make the appropriate gesture associated with the above light emission pattern, the receiver determines that response information has not been received. Consequently, operations such as remote control by the operator or the like and autopilot become possible only in the case in which the supervisor definitely sees the moving body, whereas operations such as remote control by the operator or the like and autopilot may be disabled in the case in which the supervisor does not definitely see the moving body.

A configuration is also possible in which the receiver identifies a person who makes a predetermined identifying gesture as the supervisor from image data acquired from the imager, and determines that the response information is received in a case of acquiring, from the imager, image data in which the identified person makes a predetermined gesture indicating that the light is seen.

According to this configuration, the receiver identifies a person making a predetermined identifying gesture as the supervisor from an image acquired by the imager, and determines that response information has been received in the case of acquiring, from the imager, image data of the identified person making a predetermined gesture indicating that the light is seen. For this reason, even in the case in which the image acquired from the imager includes a large number of people, the supervisor may be specified correctly, and based on the gestures of the correctly specified supervisor, the sighting of the moving body by the supervisor may be detected correctly.

A configuration is also possible in which the moving body further comprises: an imager that captures an image of a supervisor who wears a predetermined light-emitting apparatus and supervises the moving body, wherein the receiver determines that the response information is received in a case of acquiring, from the imager, image data in which a light emission state of the light-emitting apparatus is a predetermined light emission state indicating that the supervisor sees the light.

According to this configuration, the imager images the supervisor who supervises the moving body, and the receiver determines that response information has been received in the case of acquiring, from the imager, image data in which the light emission state of the light-emitting apparatus worn by the supervisor is a predetermined light emission state indicating that the supervisor sees the light. For this reason, in the case in which the supervisor is able to see the light and puts the light emission state of the light-emitting apparatus into the light emission state indicating that the light is seen within a fixed amount of time since the light was emitted by the light emitter, the receiver is able to determine that response information has been received, and the controller causes the recorder to record the position of the moving body detected by the detector and does not output to the drive the control command for causing the moving body to move to the last position recorded by the recorder. Thus, in the case in which the supervisor is able to see the moving body, operations such as remote control by the operator or the like and autopilot become possible.

On the other hand, in the case in which the supervisor is unable to see the light and does not put the light emission state of the light-emitting apparatus into the light emission state indicating that the light is seen within a fixed amount of time since the light was emitted by the light emitter, the receiver determines that the response information has not been received, and the controller outputs to the drive the control command for causing the moving body to move to the last position recorded by the recorder. For this reason, the moving body is forcibly returned to the last position where the supervisor was able to see the light emitted by the light emitter, and until the moving body returns to that position, operations such as remote control by the operator or the like and autopilot may be disabled. Consequently, operations such as remote control by the operator or the like and autopilot become possible only in the case in which the moving body is seen by the supervisor.

A configuration is also possible in which the light emitter causes the light to be emitted in at least one light emission pattern selected from among a plurality of light emission patterns, and the receiver determines that the response information is received in a case of acquiring, from the imager, image data in which the light emission state of the light-emitting apparatus is a predetermined light emission state associated with the at least one light emission pattern.

According to this configuration, light is emitted in at least one light emission pattern selected from among multiple light emission patterns, and the receiver determines that response information has been received only in the case in which the supervisor is able to see the light emitted in the light emission pattern and puts the light emission state of the light-emitting apparatus into the predetermined light emission state associated with the light emission pattern. For this reason, in the case in which the supervisor does not put the light emission state of the light-emitting apparatus into the appropriate light emission state associated with the above light emission pattern, the receiver determines that response information has not been received. Consequently, operations such as remote control by the operator or the like and autopilot become possible only in the case in which the supervisor definitely sees the moving body and puts the light emission state of the light-emitting apparatus into the appropriate light emission state, whereas operations such as remote control by the operator or the like and autopilot may be disabled in the case in which the supervisor does not definitely see the moving body and does not put the light emission state of the light-emitting apparatus into the appropriate light emission state.

A configuration is also possible in which the receiver identifies an apparatus of a predetermined identifying light emission state as the light-emitting apparatus from image data acquired from the imager, and determines that the response information is received in a case of acquiring, from the imager, image data in which the light emission state of the identified light-emitting apparatus is a predetermined light emission state indicating that the supervisor sees the light.

According to this configuration, the receiver identifies the apparatus of a predetermined identifying light emission state as the light-emitting apparatus from an image acquired by the imager, and determines that response information has been received in the case of acquiring, from the imager, image data of the light emission state of the identified light-emitting apparatus put into a predetermined light emission state indicating that the supervisor sees the light. For this reason, even in the case in which the image acquired from the imager includes apparatus in a variety of light emission states, the light-emitting apparatus being worn by the supervisor may be specified correctly, and based on the light emission state of the correctly specified light-emitting apparatus, the sighting of the moving body by the supervisor may be detected correctly.

A configuration is also possible in which the light-emitting apparatus transmits a directional signal having a predetermined directionality, and the moving body further comprises a directional signal receiver that receives the directional signal, wherein the receiver identifies an apparatus that transmits the directional signal to the directional signal receiver as the light-emitting apparatus, and determines that the response information is received in a case of acquiring, from the imager, image data in which the light emission state of the identified light-emitting apparatus is a predetermined light emission state indicating that the supervisor sees the light.

According to this configuration, the light-emitting apparatus transmits a directional signal having a predetermined directionality, the receiver identifies the apparatus that transmitted the directional signal to the directional signal receiver as the light-emitting apparatus, and determines that response information has been received in the case of acquiring, from the imager, image data of the light emission state of the identified light-emitting apparatus put into a predetermined light emission state indicating that the supervisor sees the light. For this reason, even in the case in which the image acquired from the imager includes apparatus in a variety of light emission states, the light-emitting apparatus being worn by the supervisor may be specified correctly, and based on the light emission state of the correctly specified light-emitting apparatus, the sighting of the moving body by the supervisor may be detected correctly.

A configuration is also possible in which in a case in which, after the fixed amount of time elapses, the receiver judges that the response information is received in a period during which the light emitter is not emitting light, the controller outputs to the drive the control command that causes the moving body to move to the last position recorded by the recorder.

According to this configuration, after a fixed amount of time elapses, if the receiver determines that response information has been received in a period during which the light emitter does not emit light, the control command that causes the moving body to move to the last position recorded by the recorder is output to the drive. For this reason, in the case in which an inappropriate response is executed in a period during which light is not emitted, the moving body is forcibly returned to the last position where the light emitted by the light emitter was seen, and until the moving body returns to that position, operations such as remote control by the operator or the like and autopilot may be disabled.

The light may also be visible light.

According to this configuration, a person or the like is able to see visible light from the moving body reliably, and the state in which the person or the like is seeing the moving body may be detected reliably.

The moving body may also include an unmanned air vehicle.

According to this configuration, an unmanned air vehicle may be operated only in the case in which the unmanned air vehicle is seen by a person or the like.

Additionally, the present disclosure may be realized not only as a moving body provided with a characteristic configuration like the above, but may also be realized as a control method of a moving body or the like that executes a characteristic process corresponding to the characteristic configuration provided in the moving body. Additionally, the characteristic process included in such a control method of a moving body may also be realized as a computer program executed by computer provided with a processor, memory, and the like. Consequently, even in the other aspects below, advantageous effects similar to the moving body above may be exhibited.

A control method according to another aspect of the present disclosure is a control method of a moving body provided with a drive that causes the moving body to move, a light emitter that emits light, a detector that detects a position of the moving body, and a recorder that records the position of the moving body, the control method comprising: causing the detector to detect the position of the moving body; and in a case in which the receiver receives response information indicating that an operator who operates the moving body, an observer who observes the moving body, or a supervisor who supervises the moving body sees the light within a fixed amount of time since the light emitter emitted the light, causing the recorder to record the detected position of the moving body, and in a case in which the response information is not received within the fixed amount of time, outputting to the drive a control command that causes the moving body to move to the last position recorded by the recorder.

A control program according to another aspect of the present disclosure is a control program for causing a computer to function as a control apparatus of a moving body provided with a drive that causes the moving body to move, a light emitter that emits light, a detector that detects a position of the moving body, and a recorder that records the position of the moving body, the control program causing the computer to execute a process comprising: causing the detector to detect the position of the moving body; and in a case in which the receiver receives response information indicating that an operator who operates the moving body, an observer who observes the moving body, or a supervisor who supervises the moving body sees the light within a fixed amount of time since the light emitter emitted the light, causing the recorder to record the detected position of the moving body, and in a case in which the response information is not received within the fixed amount of time, outputting to the drive a control command that causes the moving body to move to the last position recorded by the recorder.

In addition, a computer program like the above obviously may be distributed on a non-transitory computer-readable recording medium such as CD-ROM, or over a communication network such as the Internet.

Note that the embodiments described hereinafter all illustrate specific examples of the present disclosure. Features such as numerical values, shapes, structural elements, steps, and the ordering of steps indicated in the following embodiments are merely examples, and are not intended to limit the present disclosure. In addition, among the structural elements in the following exemplary embodiments, structural elements that are not described in the independent claim indicating the broadest concept are described as arbitrary or optional structural elements. Furthermore, the individual contents in all of the embodiments may also be combined. Moreover, various modifications obtained by making changes that may occur to persons skilled in the art to the embodiments of the present disclosure are also included in the present disclosure, insofar as such modifications do not depart from the gist of the present disclosure.

Hereinafter, exemplary embodiments of the present disclosure will be described with reference to the drawings.

Embodiment 1

Figure 2:
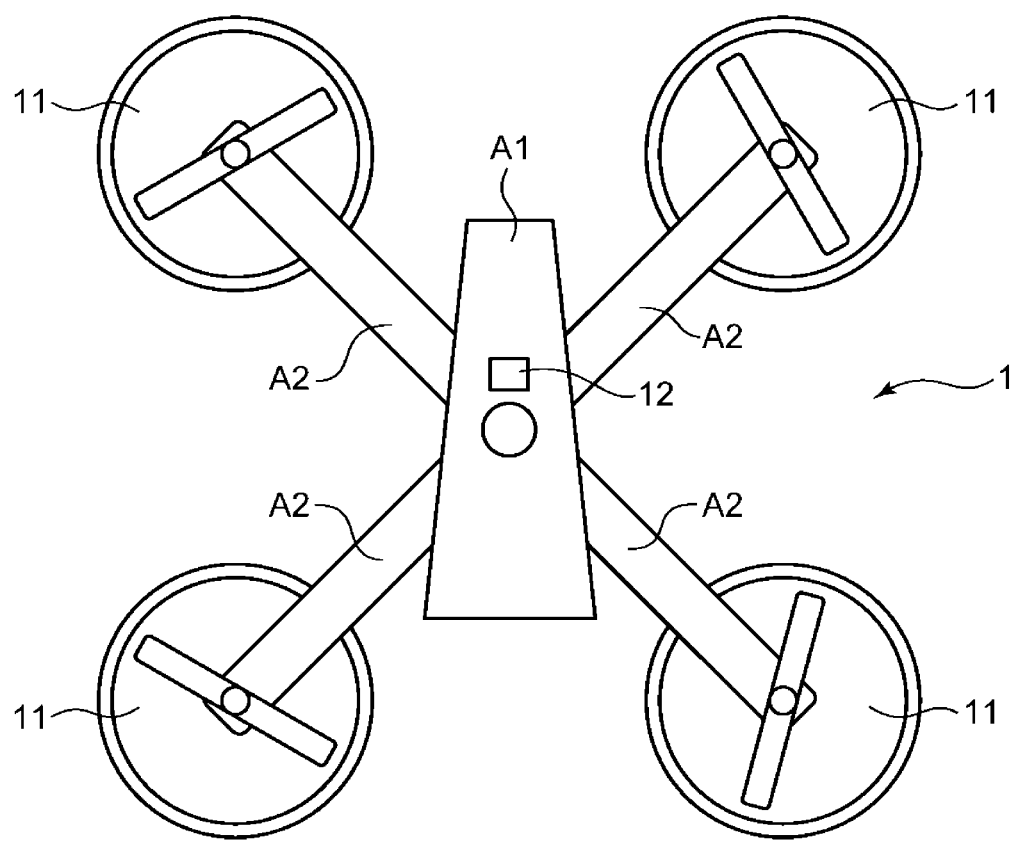
FIG. 2 is a diagram illustrating an example of the exterior of the moving body illustrated in FIG. 1.

FIG. 1 is a block diagram illustrating an example of the configuration of a moving body and a controller device according to Embodiment 1 of the present disclosure, while FIG. 2 is a diagram illustrating an example of the exterior of the moving body illustrated in FIG. 1. In FIGS. 1 and 2, the same reference signs are used with respect to the same structural elements. Note that although the present embodiment describes an unmanned air vehicle (drone) as an example of the moving body, the moving body is not particularly limited to this example, and insofar as the moving body moves within visual range of a person or the like, the present embodiment is similarly applicable to other moving bodies, such as mobile robots, cleaning robots, babysitter robots, ships, aircraft, and self-driving vehicles. This point applies similarly to the other embodiments described later.

As illustrated in FIGS. 1 and 2, a moving body 1 is provided with four support sections A2, four driving sections 11, a light-emitting section 12, a response confirmation section 13, a control section 14, a position recording section 15, a position detecting section 16, and a communication section 17. A controller device 2 is provided with a communication section 21 and an input section 22. Note that in FIG. 1, to simplify illustration, the four driving sections 11 are illustrated as a single driving section 11.

The moving body 1 is remotely controlled using the controller device 2, and an operator remotely operates the moving body 1 using the controller device 2. Also, the moving body 1 is an unmanned air vehicle capable of autonomous flight, and is able to fly autonomously without receiving remote instructions from the controller device 2.

As illustrated in FIG. 2, the four driving sections 11 are configured as propellers, and motors that cause the propellers to rotate, for example. The driving sections 11 are attached to the ends of the support sections A2 that extend in four directions from the main body A1. The light-emitting section 12 is attached to the bottom side of the main body A1. Also, the response confirmation section 13, the control section 14, the position recording section 15, the position detecting section 16, and the communication section 17 illustrated in FIG. 1 are disposed inside the main body A1. Note that the moving body 1 is provided with four driving sections 11, but is not limited thereto. For example, the moving body 1 may also be provided with one, two, three, five, or more driving sections. Also, the number and attachment position of the light-emitting section 12 is not particularly limited in the above example, and various changes are possible. For example, four light-emitting sections may be attached to the four support sections A2, respectively, and a light-emitting section may also be attached to the top side of the main body A1.

For example, the input section 22 of the controller device 2 is configured as a left stick provided on the left-hand side of the operator, a right stick provided on the right-hand side of the operator, various operating buttons, and the like. As a result of the operator operating the left stick, the right stick, the various buttons, and the like, the input section 22 receives various operations for remotely operating the moving body 1, and outputs remote control commands to the communication section 21. The communication section 21 transmits the remote control commands to the communication section 17 of the moving body 1. Note that the configuration of the input section 22 is not particularly limited to the above example, and other input apparatus such as a keyboard and a mouse may also be used, for example.

The communication section 17 of the moving body 1 receives and outputs remote control commands from the controller device 2 to the control section 14. The control section 14 controls the driving section 11, the light-emitting section 12, the response confirmation section 13, the position recording section 15, and the communication section 17. The control section 14 and the response confirmation section 13 are configured as a computer or the like provided with a processor, memory, and the like, for example, in which the computer functions as the control section 14 and the response confirmation section 13 by executing a predetermined control program. The response confirmation section 13 is an example of a receiver that receives response information indicating that an operator who operates the moving body 1, an observer who observes the moving body 1, or a supervisor who supervises the moving body 1 sees light.

The driving section 11 produces the propulsion of the moving body 1, and causes the moving body 1 to move. The driving section 11 receives instructions from the control section 14, and controls the movement of the moving body 1. By appropriately controlling the rotation speed of the propellers of the driving section 11 in response to the remote control commands, the control section 14 controls the movement direction or the flying state of the moving body 1, causing the moving body 1 to fly in accordance with the remote operation of the controller device 2.

The position detecting section 16 includes a Global Positioning System (GPS) function, and detects the position of the moving body 1. The position recording section 15 is configured as semiconductor memory or the like, for example, and records the position of the moving body 1 detected by the position detecting section 16. Note that the method of detecting the position of the moving body 1 is not particularly limited to the above example, and a variety of methods may be used. For example, an acceleration sensor may also be used to detect the position of the moving body 1. Additionally, the method of recording the position of the moving body 1 is not particularly limited to the above example, and a variety of methods may be used. For example, the communication section 17 may be used to transmit the position of the moving body 1 stored by the position recording section 15 to an external server or the like, and the position may be recorded in the external server or the like.

The light-emitting section 12 is controlled by the control section 14, and emits light in the direction of the controller device 2 at predetermined timings. The light emitted from the light-emitting section 12 preferably is visible light. In this case, the operator is able to easily see the visible light emitted from the light-emitting section 12.

In the case of seeing the light emitted from the light-emitting section 12, on the input section 22, the operator performs an operation of transmitting a response signal indicating that the light is seen. The input section 22 creates and outputs a response signal indicating that the light is seen to the communication section 21, and the communication section 21 transmits the response signal to the moving body 1. The response signal is a signal transmitted by the operator using the controller device 2 in the case in which the operator who operates the controller device 2 sees the light emitted from the light-emitting section 12.

The communication section 17 receives and outputs the response signal to the response confirmation section 13. The response confirmation section 13 confirms the response indicating that the light is seen. Specifically, in the case in which the communication section 17 receives a response signal indicating that the operator sees the light transmitted from the controller device 2, the response confirmation section 13 determines that a response confirmation is confirmed, and outputs the determination result to the control section 14.

In the case in which the response confirmation section 13 confirms a response within a fixed amount of time since the light-emitting section 12 emitted light, the control section 14 causes the position recording section 15 to record the position of the moving body 1 detected by the position detecting section 16. In the case in which the response confirmation section 13 does not confirm a response within a fixed amount of time since the light-emitting section 12 emitted light, the control section 14 outputs, to the driving section 11, a control command forcibly causing the moving body 1 to move to the last position recorded by the position recording section 15.

In the case in which the above control command is output, the driving section 11 forcibly causes the moving body 1 to move to the last position recorded by the position recording section 15, without receiving a remote control command from the operator using the controller device 2.

Note that in the situation in which the driving section 11 does not cause the moving body 1 to move back to the last position recorded by the position recording section 15 in accordance with the control command, that is, in the situation in which the above control command is not output, the method of controlling the moving body 1 may take a variety of variations, but these control methods are not intended to limit the present disclosure.

For example, the communication section 17 may receive remote control commands from the operator using the controller device 2, and the moving body 1 may control the motion of itself in accordance with the received remote control commands. As another example, the moving body 1 additionally may be provided with a command storage section that stores autonomous flight commands that control the motion of the moving body 1, various autonomous flight commands may be stored in advance in the command storage section, and by driving the driving section 11 in accordance with the autonomous flight commands stored in the command storage section, the driving section 11 may control the motion of the moving body 1 itself by automatic operation.

Also, in the situation in which the driving section 11 causes the moving body 1 to move back to the last position recorded by the position recording section 15 in accordance with the control command, that is, in the situation from the point in time when the above control command is output until the moving body 1 moves to the last position recorded by the position recording section 15, the method of controlling the moving body 1 may take a variety of variations, but these control methods are not intended to limit the present disclosure.

For example, in the case in which the above control command is output to the driving section 11, the moving body 1 may be made to move in a straight line to the last position recorded by the position recording section 15. As another example, the moving body 1 additionally may be provided with a path recording section that records the movement path of the moving body 1 itself, and in the case in which the control command is output to the driving section 11, the moving body 1 may be configured to acquire its own movement path from the path recording section, and automatically trace back along the movement path.

Note that in actuality, the following measures may also be taken to avoid a situation in which the control command causing the moving body 1 to move to the last position recorded by the position recording section 15 is not output to the driving section 11, as a result of the response signal being transmitted continually even though the operator is unable to see the light emitted by the light-emitting section 12. Note that the following points apply similarly to the other embodiments described later.

In the case in which, after the fixed amount of time elapses since the light-emitting section 12 emitted light, the response confirmation section 13 confirms a response in a period during which the light-emitting section 12 is not emitting light, the control section 14 may output to the driving section 11 the control command forcibly causing the moving body 1 to move to the last position recorded by the position recording section 15.

For example, the interval at which the light-emitting section 12 emits light may be irregular (random), and in the case in which the response confirmation section 13 confirms a response in a period during which the light-emitting section 12 is not emitting light, the control section 14 may output to the driving section 11 the control command causing the moving body 1 to move to the last position recorded by the position recording section 15.

On the other hand, even in the case in which the operator mistakenly returns a response signal while the light-emitting section 12 is not emitting light, some degree of incorrect operation may be allowed, and movement may be continued without returning to the last seen position.

For example, the control section 14 may also output the control command causing the moving body 1 to move to the last position recorded by the position recording section 15 only in the case in which the number of incorrect responses above exceeds a fixed number. Additionally, the control section 14 may also output the control command causing the moving body 1 to move to the last position recorded by the position recording section 15 only in the case in which the ratio of incorrect responses above exceeds a fixed ratio. Additionally, the counting of the number of incorrect responses above and the computation of the ratio of incorrect responses may also be reset on a fixed time interval.

In addition, the light-emitting section 12 may also be configured to emit light in at least one light emission pattern selected by the control section 14 from among multiple light emission patterns. In this case, the response signal is transmitted from the controller device 2 in the case in which the operator operates the controller device 2 by a predetermined operation associated with the above light emission pattern.

Specifically, the control section 14 stores multiple light emission patterns in internal memory or the like in advance, selects one light emission pattern according to a predetermined sequence or randomly, and causes the light-emitting section 12 to emit light in the selected light emission pattern. For example, the light-emitting section 12 is made to emit light in a variety of variations, such as by changing the color of the emitted light from the light-emitting section 12, changing the intensity of the emitted light from the light-emitting section 12, turning on the light-emitting section 12 or causing the light-emitting section 12 to emit blinking light, altering the blink count, blink time, and blink interval of the light-emitting section 12, and the like. In this case, since the light is not simply turned on, the emission of the light from the moving body 1 may be distinguished more easily.

The operator seeing the above light emission pattern uses the input section 22 to perform an operation preassigned to the above light emission pattern, such as pressing one or multiple specific buttons, pressing a specific button a predetermined number of times in succession, or the like. Only in the case in which the operation preassigned to the above light emission pattern is performed, the input section 22 creates and outputs to the communication section 21 a response signal indicating that the light is seen, and the communication section 21 transmits the response signal to the moving body 1.

Consequently, only in the case of receiving the response signal transmitted by the predetermined operation preassigned to the light emission pattern, the response confirmation section 13 is able to determine that a response is confirmed, and is able to confirm more reliably that the operator sees the moving body 1.

In addition, the light-emitting section 12 may also cause light to be emitted in at least one light emission pattern selected from among multiple light emission patterns, the controller device 2 may transmit a response signal associated with the at least one light emission pattern in accordance with a predetermined operation associated with the at least one light emission pattern by the operator, and the response confirmation section 13 may determine that a response is confirmed only in the case of receiving the response signal associated with the at least one light emission pattern emitted by the light-emitting section 12. In this case, advantageous effects similar to the above may be obtained even if the controller device 2 that transmits the response signal does not know which light emission pattern is selected at the time from among the multiple light emission patterns.

In addition, predetermined information may also be superimposed onto the light emission pattern of the light-emitting section 12. For example, a Morse code signal may be transmitted by the light emission pattern of the light-emitting section 12. In this case, various information may be transmitted, and only in the case of receiving a response signal transmitted by an operation preassigned to the information, the response confirmation section 13 is able to determine that a response is confirmed, and is able to confirm more reliably that the operator sees the moving body 1.

Figure 3:
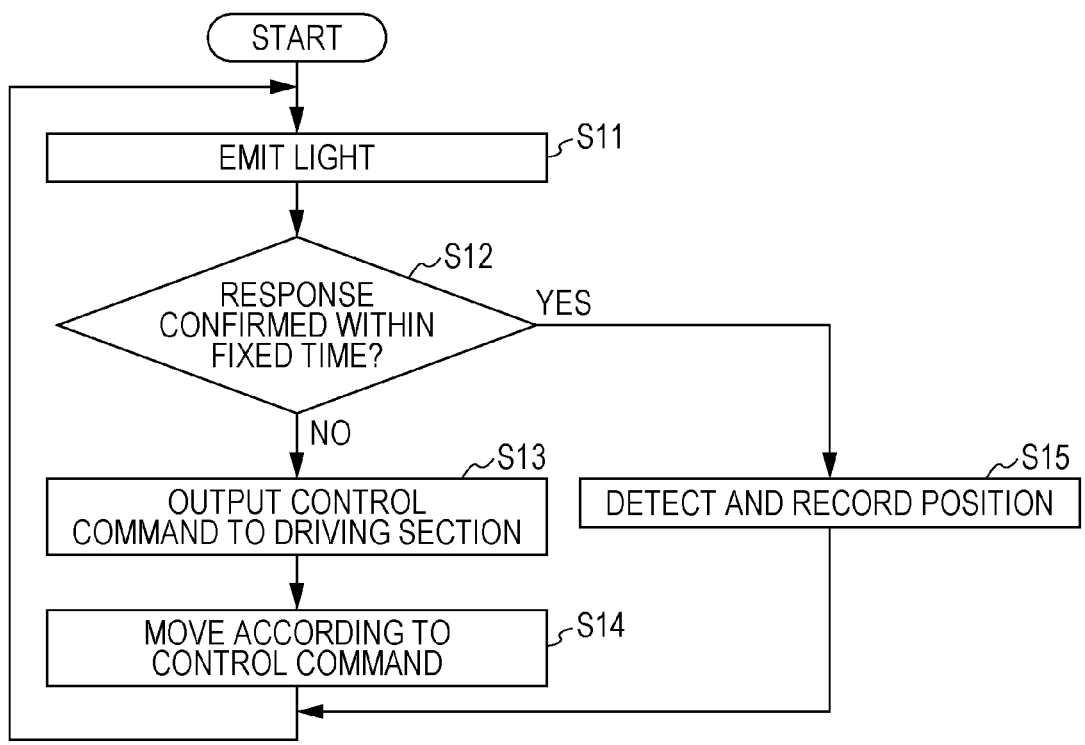
FIG. 3 is a flowchart illustrating an example of a movement control process of the moving body illustrated in FIG. 1.
Figure 4:
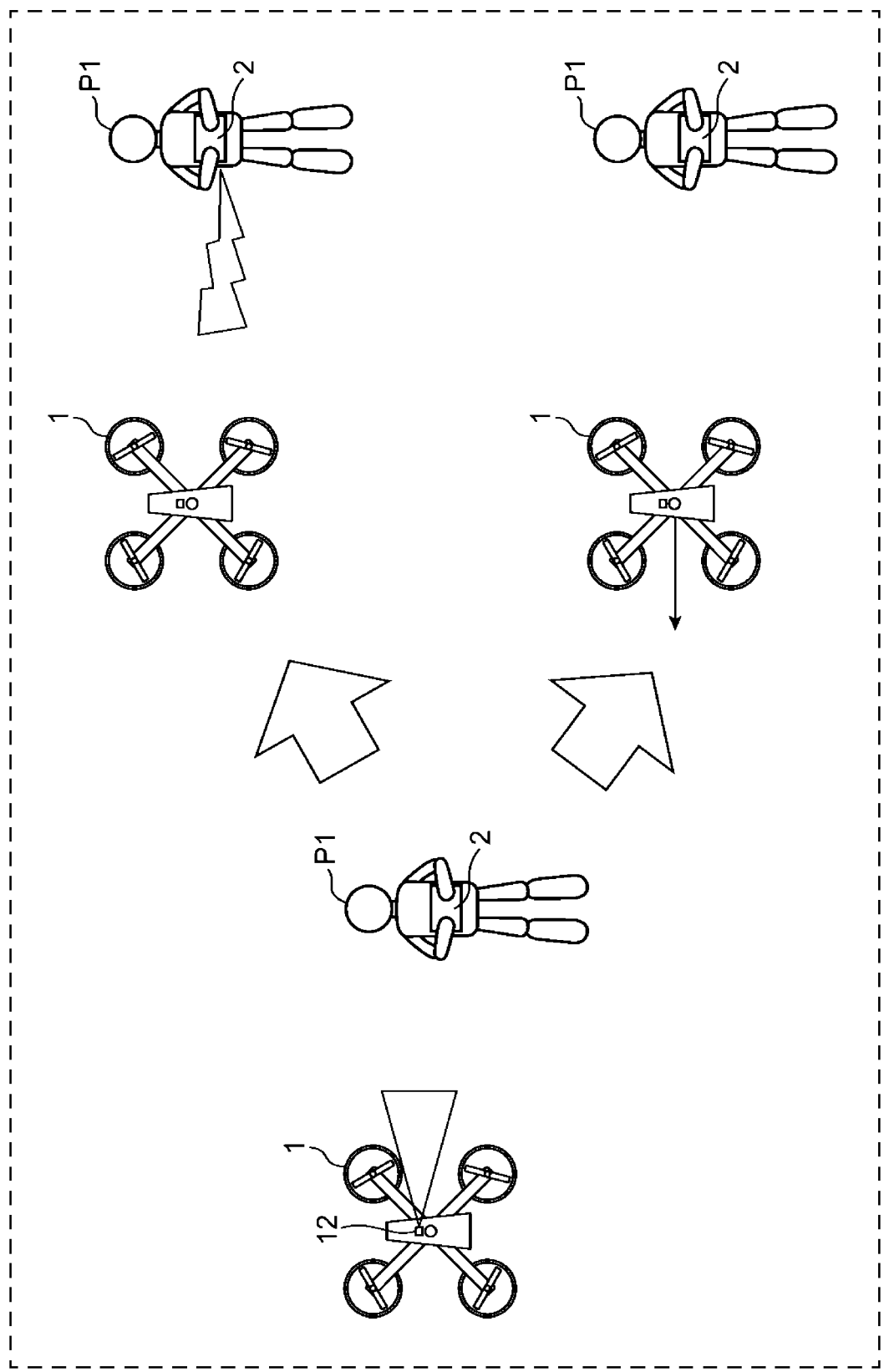
FIG. 4 is a schematic diagram illustrating an example of usage states of the moving body and controller device illustrated in FIG. 1.

FIG. 3 is a flowchart illustrating an example of a movement control process of the moving body 1 illustrated in FIG. 1, and FIG. 4 is a schematic diagram illustrating an example of usage states of the moving body 1 and the controller device 2 illustrated in FIG. 1.

First, the light-emitting section 12 of the moving body 1 emits light (step S11). For example, as illustrated in the left part of FIG. 4, the light-emitting section 12 of the moving body 1 emits light in the direction of an operator P1 who is operating the controller device 2.

Next, the control section 14 asks the response confirmation section 13 whether or not the response confirmation section 13 has confirmed a response within a fixed amount of time since the light-emitting section 12 emitted light (step S12). In the case in which the response confirmation section 13 has confirmed a response, that is, in the case in which a response signal is transmitted from the controller device 2 and the response confirmation section 13 acquires the response signal from the communication section 17 (step S12, YES), the control section 14 causes the position detecting section 16 to detect the position of the moving body 1, records the detected position of the moving body 1 in the position recording section 15 (step S15), and after that, returns to step S11 and continues the process thereafter.

For example, as illustrated in the upper-right part of FIG. 4, in the case in which the operator P1 sees the light from the light-emitting section 12, and operates the controller device 2 to transmit a response signal to the moving body 1, the response confirmation section 13 acquires the response signal from the communication section 17, and the control section 14 records the position of the moving body 1 detected by the position detecting section 16 in the position recording section 15.

On the other hand, in the case in which the response confirmation section 13 does not confirm a response, that is, in the case in which a response signal is not transmitted from the controller device 2, and the response confirmation section 13 does not acquire a response signal from the communication section 17 (step S12, NO), the control section 14 outputs to the driving section 11 a control command that forcibly causes the moving body 1 to move to the last position recorded by the position recording section 15 (step S13).

Next, the driving section 11 follows the control command and causes the moving body 1 to move to the last position recorded by the position recording section 15 (step S14), and after that, returns to step S11 and continues the process thereafter.

For example, as illustrated in the lower-right part of FIG. 4, in the case in which the operator P1 is unable to see the light from the light-emitting section 12 and does not operate the controller device 2 to transmit a response signal to the moving body 1, the response confirmation section 13 does not acquire a response signal from the communication section 17, the control section 14 outputs to the driving section 11 the control command that forcibly causes the moving body 1 to move to the last position recorded by the position recording section 15, and the moving body 1 moves to the last position recorded by the position recording section 15 and hovers in place. Note that in the above process, after the process of step S14, the flow returns to step S11 and the process thereafter is continued, but the process is not particularly limited to this example, and various modifications are possible, such as landing at the last position recorded by the position recording section 15 and ending the process.

By the above process, in the present embodiment, in the case in which the operator sees the light and transmits a response signal indicating that the light is seen from the controller device 2 within a fixed amount of time since the light-emitting section 12 emitted the light, the communication section 17 receives and outputs the response signal to the response confirmation section 13, the response confirmation section 13 determines that a response is confirmed, and the control section 14 causes the position recording section 15 to record the position of the moving body detected by the position detecting section 16, and does not output to the driving section 11 the control command that forcibly causes the moving body 1 to move to the last position recorded by the position recording section 15. For this reason, operations such as remote control by the operator and autopilot become possible.

On the other hand, in the case in which the operator is unable to see the light, and the response signal indicating that the light is seen is not transmitted from the controller device 2 within a fixed amount of time since the light was emitted by the light-emitting section 12, the communication section 17 does not receive a response signal, the response confirmation section 13 determines that a response is not confirmed, and the control section 14 outputs to the driving section 11 the control command that forcibly causes the moving body 1 to move to the last position recorded by the recording section 15. For this reason, the moving body 1 is forcibly returned to the last position where the operator was able to see the light emitted by the light-emitting section 12, and until the moving body 1 returns to that position, operations such as remote control by the operator and autopilot may be disabled. Consequently, the moving body 1 may be operated only in the case in which the moving body 1 is seen by the operator.

Note that in the above embodiment, the response signal is transmitted from the controller device 2, but the configuration is not particularly limited to this example, and the response signal may also be transmitted from another apparatus.

For example, in the case in which an observer who observes the moving body 1 is present instead of an operator, the response signal may be configured to be transmitted from an observation apparatus by which the observer observes the moving body 1. In this case, the observation apparatus is provided with the communication section 21 and the input section 22 illustrated in FIG. 1, and in the case in which the observer who operates the observation apparatus sees the light, the observer uses the observation apparatus to transmit a response signal. In the case in which the communication section 17 receives the response signal transmitted from the observation apparatus for observing the moving body 1, the response confirmation section 13 determines that a response is confirmed, whereas in the case in which the communication section 17 does not receive the response signal, the response confirmation section 13 determines that a response is not confirmed. Note that the observer and the operator may also be the same person or the like. In this case, the operator may transmit the response signal from an observation apparatus (radio equipment) which is a different apparatus from the controller device.

In addition, the light-emitting section 12 may also emit light in at least one light emission pattern selected from among multiple light emission patterns, and in the case in which the observer operates the observation apparatus by a predetermined operation associated with the light emission pattern, the response signal may be transmitted from the observation apparatus.

In the above case, if the observer sees the light and transmits a response signal indicating that the light is seen from the observation apparatus within a fixed amount of time since the light-emitting section 12 emitted the light, the communication section 17 receives and outputs the response signal to the response confirmation section 13, the response confirmation section 13 determines that a response is confirmed, and the control section 14 causes the position recording section 15 to record the position of the moving body detected by the position detecting section 16, and does not output to the driving section 11 the control command that forcibly causes the moving body 1 to move to the last position recorded by the position recording section 15. For this reason, in the case in which the observer is able to see the moving body 1, operations such as remote control by the operator or the like and autopilot become possible.

On the other hand, in the case in which the observer is unable to see the light, and the response signal indicating that the light is seen is not transmitted from the observation apparatus within a fixed amount of time since the light was emitted by the light-emitting section 12, the communication section 17 does not receive a response signal, the response confirmation section 13 determines that a response is not confirmed, and the control section 14 outputs to the driving section 11 the control command that forcibly causes the moving body 1 to move to the last position recorded by the recording section 15. For this reason, the moving body 1 is forcibly returned to the last position where the observer was able to see the light emitted by the light-emitting section 12, and until the moving body 1 returns to that position, operations such as remote control by the operator or the like and autopilot may be disabled. Consequently, the moving body 1 may be operated only in the case in which the moving body is seen by the observer.

In addition, the light-emitting section 12 may also cause light to be emitted in at least one light emission pattern selected from among multiple light emission patterns, the observation apparatus may transmit a response signal associated with the at least one light emission pattern in accordance with a predetermined operation associated with the at least one light emission pattern by the observer, and the response confirmation section 13 may determine that a response is confirmed only in the case of receiving the response signal associated with the at least one light emission pattern emitted by the light-emitting section 12. In this case, advantageous effects similar to the above may be obtained even if the observation apparatus that transmits the response signal does not know which light emission pattern is selected at the time from among the multiple light emission patterns.

Embodiment 2

Figure 5:
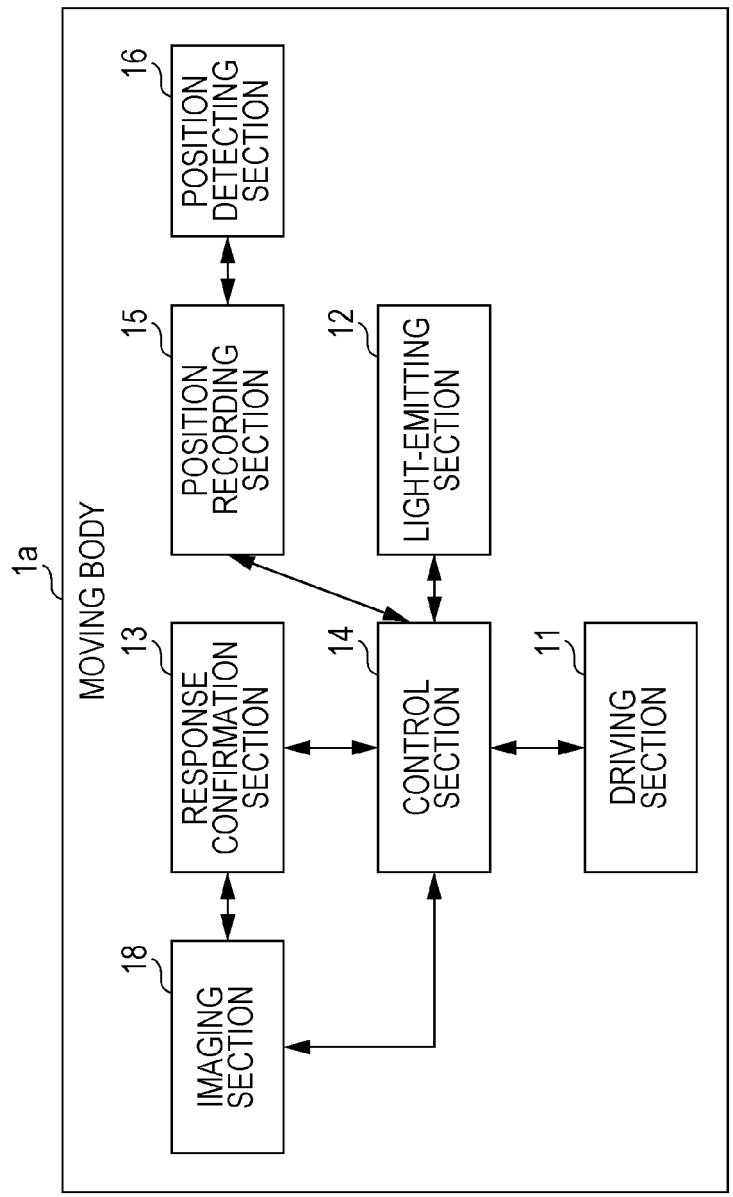
FIG. 5 is a block diagram illustrating an example of the configuration of a moving body according to Embodiment 2 of the present disclosure.

FIG. 5 is a block diagram illustrating an example of the configuration of a moving body according to Embodiment 2 of the present disclosure. The moving body 1a illustrated in FIG. 5 differs from the moving body 1 illustrated in FIG. 1 in that the communication section 17 is omitted and an imaging section 18 is added. Otherwise, the configuration is similar to the moving body 1 illustrated in FIG. 1, and for this reason, detailed description will be omitted, and the points that differ will be described below.

The moving body 1a is an unmanned air vehicle that flies by autonomous flight, and is able to fly autonomously without receiving remote instructions from a controller device. However, the flying state of the moving body 1a is supervised visually by a supervisor. The supervisor corresponds to an observer similar to Embodiment 1, for example.

Note that the configuration of the moving body 1a is not particularly limited to the above example, and a communication section may be added so that an operator may use a controller device to remotely operate the moving body 1a. Also, the supervisor is not particularly limited to the above example, and may also be the operator in the case in which an operator uses a controller device to remotely operate the moving body 1a. The supervisor may also be a person other than the observer and the operator insofar as the person is able to see the moving body 1a. Additionally, the supervisor may also be a supervising apparatus such as a humanoid robot insofar as the apparatus is able to execute a process similar to a human sighting by camera imaging or the like. This point applies similarly to the embodiments described later.

The imaging section 18 of the moving body 1a is configured as a camera or the like that captures the supervisor who supervises the moving body, and outputs captured image data to the response confirmation section 13. For example, the imaging section 18 is controlled by the control section 14 to automatically track the supervisor and capture the supervisor continually during flight. Additionally, the imaging section 18 reports the direction of the automatically tracked supervisor to the control section 14. The light-emitting section 12 is controlled by the control section 14, and emits light in the direction of the supervisor at predetermined timings. The response confirmation section 13 analyzes image data from the imaging section 18, and in the case of acquiring, from the imaging section 18, image data in which the supervisor makes a predetermined gesture indicating that the light emitted from the light-emitting section 12 is seen, the response confirmation section 13 determines that a response indicating that the supervisor sees the light emitted from the light-emitting section 12 is confirmed.

Note that the method of identifying the supervisor from image data captured by the imaging section 18 is not particularly limited to the above example, and a variety of methods may be used. For example, the supervisor may also be made to make a predetermined identifying gesture by which the moving body 1a identifies the supervisor. In this case, the response confirmation section 13 may analyze the image data from the imaging section 18, identify the person making the predetermined identifying gesture from the image acquired from the imaging section 18 as the supervisor, and in the case of acquiring, from the imaging section 18, image data in which the identified person makes a predetermined gesture indicating that the light is seen, the response confirmation section 13 may determine that a response is confirmed.

Figure 6:
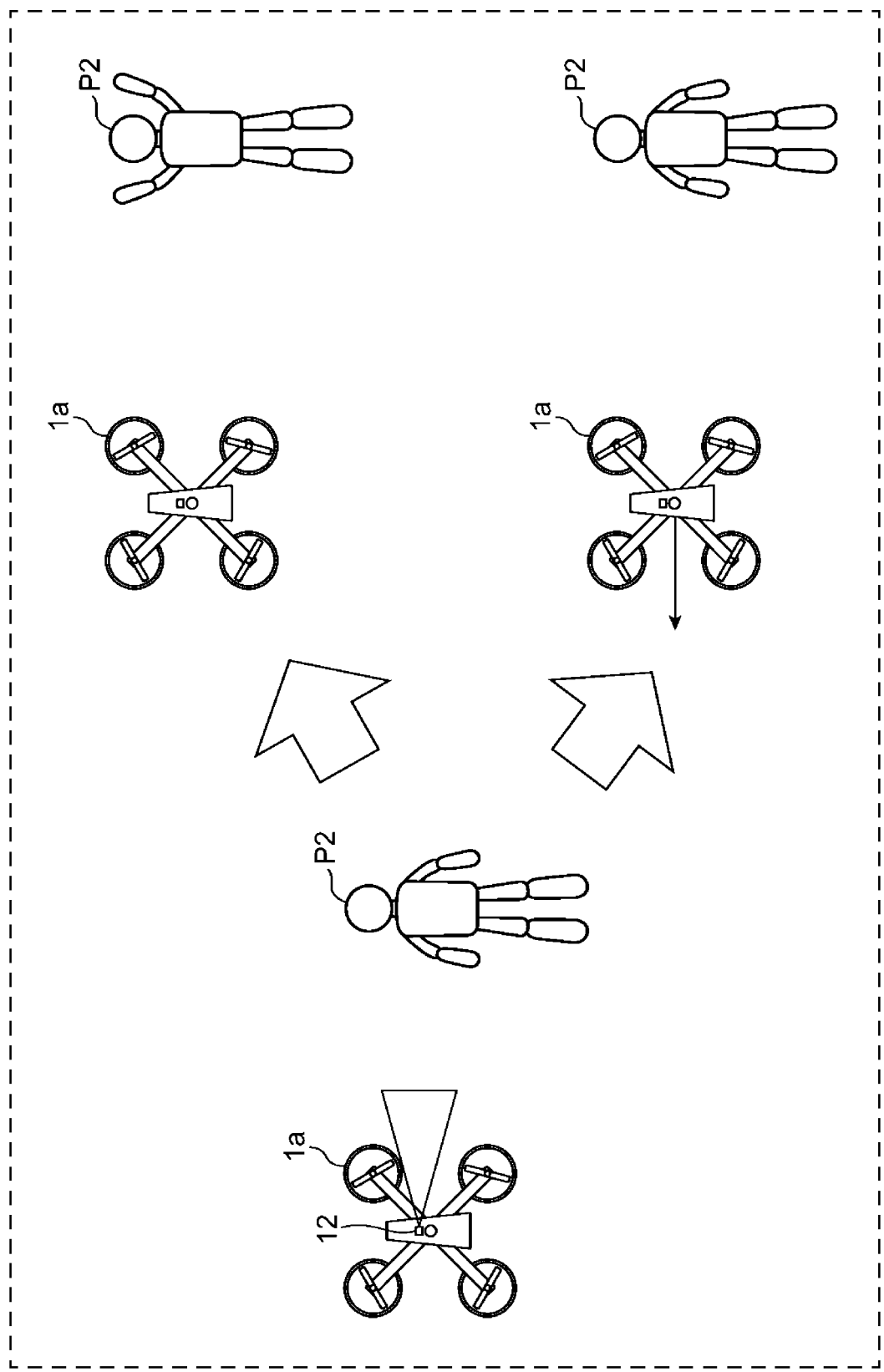
FIG. 6 is a schematic diagram illustrating an example of usage states of the moving body illustrated in FIG. 5.

FIG. 6 is a schematic diagram illustrating an example of usage states of the moving body 1a illustrated in FIG. 5. For example, as illustrated in the left part of FIG. 6, the light-emitting section 12 of the moving body 1a is controlled by the control section 14 to emit light in the direction of a supervisor P2 who supervises the moving body 1a.

Next, as illustrated in the upper-right part of FIG. 6, in the case in which the supervisor P2 is able to see the light from the light-emitting section 12 and makes a predetermined gesture, such as raising both hands, for example, within a fixed amount of time since the light-emitting section 12 emitted the light, the imaging section 18 outputs image data of the supervisor P2 raising both hands to the response confirmation section 13. The response confirmation section 13, by determining that the gesture of the supervisor P2 raising both hands is a gesture indicating that the light is seen, determines that a response indicating that the supervisor sees the light emitted from the light-emitting section 12 is confirmed. In the case in which the response confirmation section 13 confirms a response, the control section 14 causes the position recording section 15 to record the position of the moving body 1a detected by the position detecting section 16.

Herein, similarly to Embodiment 1, the light-emitting section 12 may also be configured to emit light in at least one light emission pattern selected from among multiple light emission patterns. In this case, a gesture of the supervisor is predetermined with respect to each light emission pattern, and when the supervisor sees the light from the light-emitting section 12, the supervisor makes the specific gesture predetermined with respect to the light emission pattern. In the case of acquiring, from the imaging section 18, image data in which the supervisor makes the specific gesture associated with the light emission pattern, the response confirmation section 13 determines that a response is confirmed. Note that a variety of gestures, such as raising the right hand or the left hand, waving the right hand or the left hand, and the like may be used as the specific gestures, and furthermore, various modifications are also possible, such as combining different motions, changing the number of movements performed successively, and the like.

On the other hand, as illustrated in the lower-right part of FIG. 6, in the case in which the supervisor P2 is unable to see the light from the light-emitting section 12 and does not make a predetermined gesture, such as raising both hands, for example, within a fixed amount of time since the light-emitting section 12 emitted the light, the imaging section 18 does not output image data of the supervisor P2 raising both hands to the response confirmation section 13. The response confirmation section 13, being unable to acquire image data of the supervisor P2 raising both hands, determines that a response indicating that the supervisor sees the light emitted from the light-emitting section 12 is not confirmed. In the case in which the response confirmation section 13 does not confirm a response, the control section 14 outputs to the driving section 11 a control command that forcibly causes the moving body 1a to move to the last position recorded by the position recording section 15, and the moving body 1a moves to the last position recorded by the position recording section 15 and hovers in place.

According to the above process, in the present embodiment, in the case in which the supervisor sees the light emitted by the light-emitting section 12 and makes a predetermined gesture indicating that the light is seen within a fixed amount of time since the light-emitting section 12 emitted the light, the response confirmation section 13 determines that a response is confirmed, and the control section 14 causes the position recording section 15 to record the position of the moving body 1a detected by the position detecting section 16, and does not output to the driving section 11 the control command that forcibly causes the moving body 1a to move to the last position recorded by the position recording section 15. For this reason, in the case in which the supervisor is able to see the moving body 1a, operations such as remote control by the operator or the like and autopilot become possible.

On the other hand, in the case in which the supervisor is unable to see the light, and does not make the predetermined gesture indicating that the light is seen within a fixed amount of time since the light was emitted by the light-emitting section 12, the receiving section 13 determines that a response is not confirmed, and the control section 14 outputs to the driving section 11 the control command that forcibly causes the moving body 1a to move to the last position recorded by the recording section 15. For this reason, the moving body 1a is forcibly returned to the last position where the supervisor was able to see the light emitted by the light-emitting section 12, and until the moving body 1a returns to that position, operations such as remote control by the operator or the like and autopilot may be disabled. Consequently, operations such as remote control by the operator or the like and autopilot become possible only in the case in which the moving body 1a is seen by the supervisor.

Embodiment 3

Figure 7:
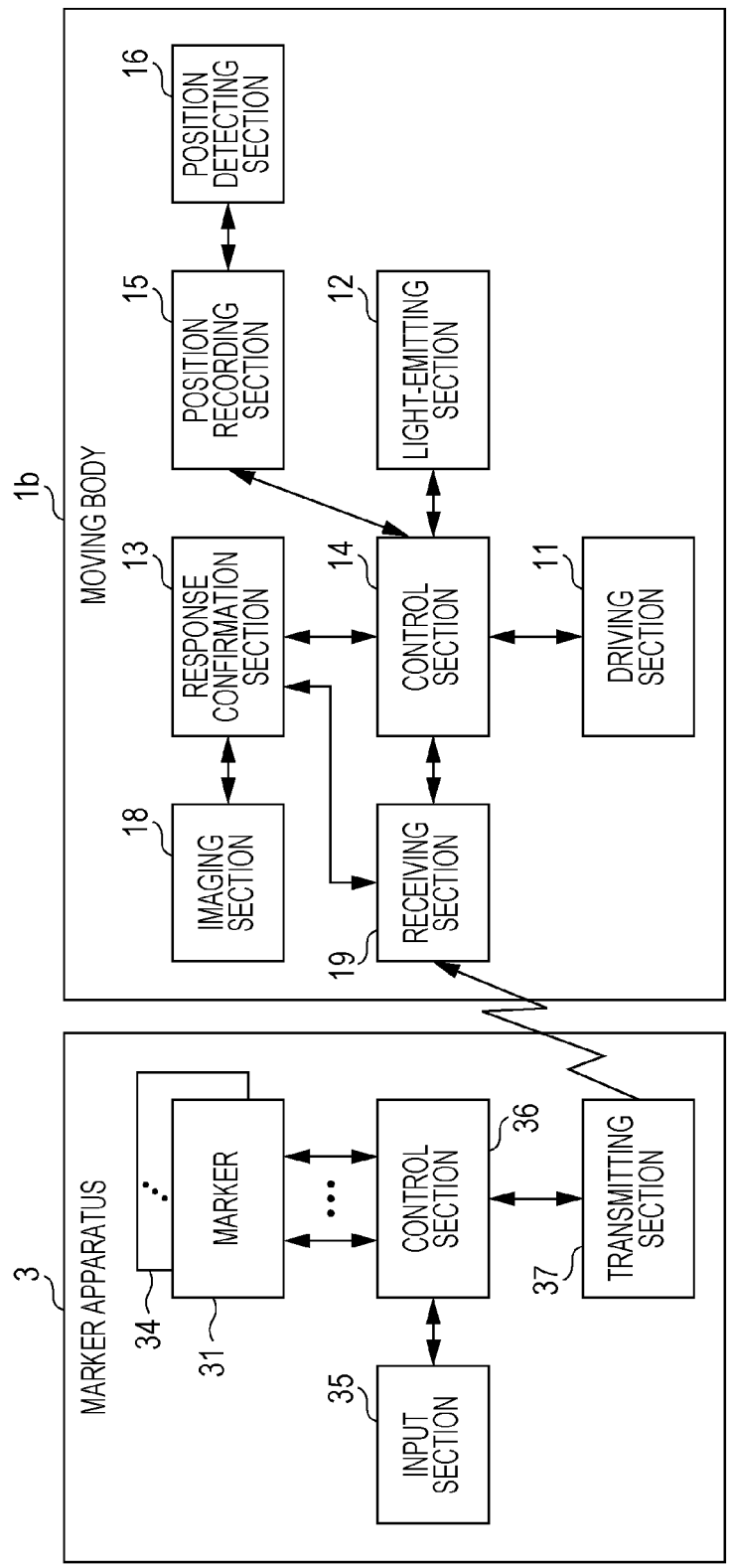
FIG. 7 is a block diagram illustrating an example of the configuration of a moving body and a marker apparatus according to Embodiment 3 of the present disclosure.

FIG. 7 is a block diagram illustrating an example of the configuration of a moving body and a marker apparatus according to Embodiment 3 of the present disclosure. As illustrated in FIG. 7, the marker apparatus 3 is an example of a light-emitting apparatus, and is provided with four markers 31 to 34, an input section 35, a control section 36, and a transmitting section 37. Also, the moving body 1b illustrated in FIG. 7 differs from the moving body 1a illustrated in FIG. 5 in that a receiving section 19 is added. Otherwise, the configuration is similar to the moving body 1a illustrated in FIG. 5, and for this reason, detailed description will be omitted, and the points that differ will be described below.

Similarly to Embodiment 2, the moving body 1b is an unmanned air vehicle that flies by autonomous flight, and is able to fly autonomously without receiving remote instructions from a controller device. However, the flying state of the moving body 1*b* is supervised visually by a supervisor. Also, in the present embodiment, to simplify image analysis in the moving body 1*b*, the supervisor who supervises the moving body 1*b* wears the marker apparatus 3, and the moving body 1*b* analyzes the light emission state of the marker apparatus 3 to thereby judge whether or not the supervisor is making a specific gesture, and determine whether or not the supervisor sees the light emitted from the moving body 1*b*. Note that the determination of whether or not the supervisor sees the light emitted from the moving body 1*b* is not particularly limited to the above example, and the supervisor may also not make a specific gesture, so that the determination is made from only the light emission state of the marker apparatus 3.

Specifically, the transmitting section 37 of the marker apparatus 3 is controlled by the control section 36, and at a predetermined timing, transmits a directional signal (such as infrared rays or sound waves) having a predetermined directionality. The receiving section 19 of the moving body 1*b* receives and outputs the directional signal to the response confirmation section 13 and the control section 14. The receiving section 19 is an example of a directional signal receiver that receives the directional signal.

The light-emitting section 12 is controlled by the control section 14, and at a predetermined timing, emits light in the direction of the supervisor who wears the marker apparatus 3 and supervises the moving body 1*b*. The imaging section 18 captures the supervisor who wears the marker apparatus 3 and supervises the moving body 1*b*, and outputs captured image data to the response confirmation section 13.

The input section 35 is configured as various operating buttons and the like by which the supervisor controls the light emission state of the markers 31 to 34. The supervisor inputs into the input section 35 a light emission confirmation operation indicating that the supervisor sees the light emitted from the light-emitting section 12, and the input section 35 reports the input of the light emission confirmation operation to the control section 36. When the light emission confirmation operation is reported, the control section 36 controls the markers 31 to 34 to emit light in a predetermined light emission state indicating that the supervisor sees the light emitted from the light-emitting section 12.

The markers 31 to 34 are configured as indicator lights or the like that emit visible light, for example, and emit light in a predetermined light emission state. Note that the number of markers is not particularly limited to the above example, and may also be from 1 to 3, or may be 4 or more. Also, the configuration of the markers 31 to 34 is not particularly limited to the above example, and markers or the like which do not emit light may also be used insofar as the markers are usable as signs or beacons.

The response confirmation section 13 identifies the apparatus that transmitted the directional signal to the receiving section 19 from image data captured by the imaging section 18, and identifies the supervisor to see. Also, in the case of acquiring, from the imaging section 18, image data in which the light emission state of the identified marker apparatus 3 is a predetermined light emission state indicating that the supervisor sees the light, the response confirmation section 13 determines that a response indicating that the supervisor sees the light emitted from the light-emitting section 12 is confirmed.

Note that in the present embodiment, a directional signal transmitted from the marker apparatus 3 is used to identify the marker apparatus 3, that is, the supervisor, but the method of identifying the supervisor is not particularly limited to this example, and various modifications are possible.

For example, the transmitting section 37 and the receiving section 19 may be omitted, and a specific pattern (such as a striped pattern or a staggered pattern, for example) may be applied to the markers 31 to 34. In this case, by extracting a specific pattern by image recognition from image data captured by the imaging section 18, the response confirmation section 13 is able to identify the apparatus having the specific pattern as the marker apparatus 3, and identify the supervisor to see. At this time, the identified supervisor may be made to make a predetermined gesture indicating that the light emitted from the light-emitting section 12 is seen, the response confirmation section 13 may recognize the motion of the supervisor from image data of the imaging section 18, and in the case of acquiring, from the imaging section 18, image data in which the supervisor makes the predetermined gesture indicating that the light emitted from the light-emitting section 12 is seen, the response confirmation section 13 may determine that a response indicating that the supervisor sees the light emitted from the light-emitting section 12 is confirmed.

Also, the transmitting section 37 and the receiving section 19 may be omitted, and the markers 31 to 34 may be configured to emit light in a specific identifying light emission pattern. For example, the markers 31 to 34 may be configured to emit light in a variety of variations, such as by changing the color of the emitted light from the markers 31 to 34, changing the intensity of the emitted light from the markers 31 to 34, turning on the markers 31 to 34 or causing the markers 31 to 34 to emit blinking light, altering the blink count, blink time, and blink interval of the markers 31 to 34, and the like. In addition, predetermined information may also be superimposed onto the light emission pattern of the markers 31 to 34. For example, a Morse code signal may be transmitted by the light emission pattern of the markers 31 to 34.

In this case, by extracting a specific identifying light emission state by image recognition from image data captured by the imaging section 18, the response confirmation section 13 is able to identify the apparatus including markers emitting light in the specific identifying light emission state as the marker apparatus 3, and identify the supervisor to see. At this time, the identified supervisor may be made to make a predetermined gesture indicating that the light emitted from the light-emitting section 12 is seen, the response confirmation section 13 may recognize the motion of the supervisor from image data of the imaging section 18, and in the case of acquiring, from the imaging section 18, image data in which the supervisor makes the predetermined gesture indicating that the light emitted from the light-emitting section 12 is seen, the response confirmation section 13 may determine that a response indicating that the supervisor sees the light emitted from the light-emitting section 12 is confirmed. In addition, the supervisor may be enabled to control the timing at which the markers 31 to 34 emit light in a specific identifying light emission state, and use the specific identifying light emission state of the markers 31 to 34 as a response indicating that the supervisor sees the light emitted from the light-emitting section 12.

Figure 8:
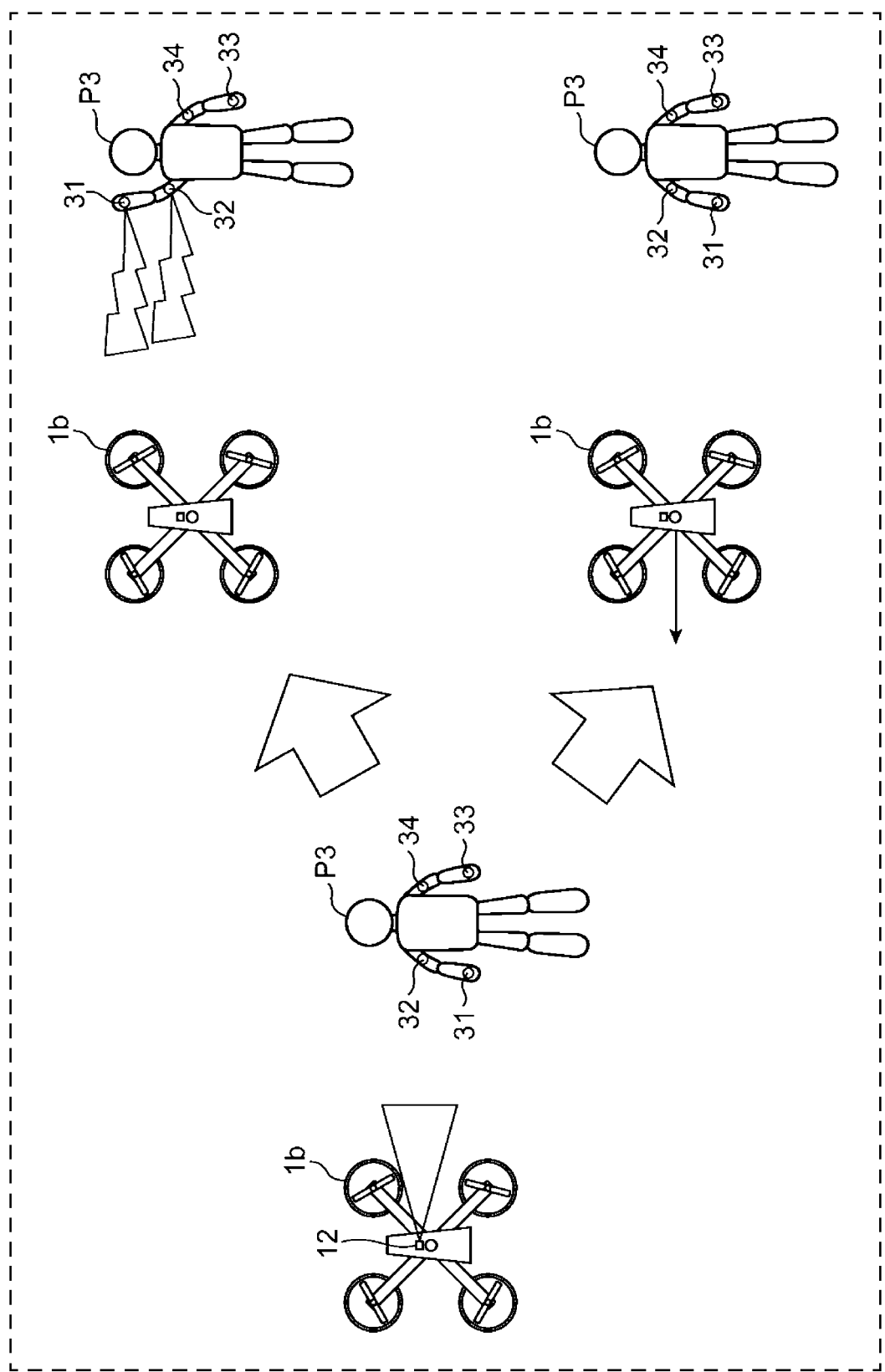
FIG. 8 is a schematic diagram illustrating an example of usage states of the moving body and marker apparatus illustrated in FIG. 7.

FIG. 8 is a schematic diagram illustrating an example of usage states of the moving body 1*b* and marker apparatus 3 illustrated in FIG. 7. For example, as illustrated in the left part of FIG. 8, the light-emitting section 12 of the moving body b is controlled by the control section 14 to emit light in the direction of a supervisor P3 who supervises the moving body 1b. The supervisor wears the marker 31 on the right wrist, the marker 32 on the right elbow, the marker 33 on the left wrist, and the marker 34 on the left elbow. At this time, the markers 31 to 34 are turned off to distinguish from the light emission state described later, for example. Note that the wear positions of the markers are not particularly limited to the above example, and various modifications are possible, such as wearing the markers on the feet, the torso, and the like. In addition, the light-emitting apparatus is not particularly limited to the marker apparatus 3, and a variety of light-emitting apparatus may be used insofar as the apparatus is capable of emitting light in a light emission state indicating that the supervisor sees the moving body 1b.

Next, as illustrated in the upper-right part of FIG. 8, in the case in which the supervisor P3 sees the light from the light-emitting section 12 within a fixed amount of time since the light-emitting section 12 emitted the light, the supervisor P3 performs a light emission confirmation operation with respect to the input section 35. The input section 35 notifies the control section 36 that the light emission confirmation operation has been input, the control section 36 produces a predetermined light emission state indicating that the supervisor sees the light emitted from the light-emitting section 12, such as by turning on the markers 31 and 32, for example, and the supervisor P3 raises one's right arm on which the turned-on markers 31 and 32 are worn. At this time, the imaging section 18 outputs to the response confirmation section 13 image data of the supervisor P3 raising one's right arm on which the turned-on markers 31 and 32 are worn. The response confirmation section 13, by determining that the raised state of the right arm on which the turned-on markers 31 and 32 are worn is the state indicating that the light is seen, determines that a response indicating that the supervisor sees the light emitted from the light-emitting section 12 is confirmed. In the case in which the response confirmation section 13 confirms a response, the control section 14 causes the position recording section 15 to record the position of the moving body 1b detected by the position detecting section 16.

Herein, similarly to Embodiments 1 and 2, the light-emitting section 12 may also be configured to emit light in at least one light emission pattern selected from among multiple light emission patterns. In this case, a light emission state of the markers 31 to 34 is predetermined with respect to each light emission pattern, and when the supervisor sees the light from the light-emitting section 12, the marker apparatus 3 causes the markers 31 to 34 to emit light in the specific light emission state predetermined with respect to the light emission pattern. In the case of acquiring, from the imaging section 18, image data in which the light emission state of the marker apparatus 3 is the specific light emission state associated with the light emission pattern, the response confirmation section 13 determines that a response is confirmed. Note that various modifications are possible as specific light emission states, such as by changing the light emission state of each of the markers 31 to 34, combining changed light emission patterns, making the time of each light emission pattern different, and the like.

On the other hand, as illustrated in the lower-right part of FIG. 8, in the case in which the supervisor P3 is unable to see the light from the light-emitting section 12 and does not perform the light emission confirmation operation with respect to the input section 35 within a fixed amount of time since the light-emitting section 12 emitted the light, such as in the case in which the markers 31 to 34 are turned off, for example, the imaging section 18 outputs to the response confirmation section 13 image data in which the markers 31 to 34 are turned off. In this case, since the response confirmation section 13 is unable to acquire image data of the predetermined light emission state indicating that the supervisor P3 sees the light emitted from the light-emitting section 12, such as raising one's right arm on which the turned-on markers 31 and 32 are worn, for example, the response confirmation section 13 determines that a response indicating that the supervisor sees the light emitted from the light-emitting section 12 is not confirmed. In the case in which the response confirmation section 13 does not confirm a response, the control section 14 outputs to the driving section 11 a control command that forcibly causes the moving body 1b to move to the last position recorded by the position recording section 15, and the moving body 1b moves to the last position recorded by the position recording section 15 and hovers in place.

According to the above process, in the present embodiment, the imaging section 18 images the supervisor who supervises the moving body 1b, and the response confirmation section 13 determines that a response is confirmed in the case of acquiring, from the imaging section 18, image data in which the light emission state of the marker apparatus 3 worn by the supervisor is a predetermined light emission state indicating that the supervisor sees the light. For this reason, in the case in which the supervisor is able to see the light and puts the light emission state of the marker apparatus 3 into the light emission state indicating that the light is seen within a fixed amount of time since the light was emitted by the light-emitting section 12, the response confirmation section 13 is able to determine that a response is confirmed, and the control section 14 causes the position recording section 15 to record the position of the moving body 1b detected by the position detecting section 16 and does not output to the driving section 11 the control command for causing the moving body 1b to move to the last position recorded by the position recording section 15. Thus, in the case in which the supervisor is able to see the moving body 1b, operations such as remote control by the operator or the like and autopilot become possible.

On the other hand, in the case in which the supervisor is unable to see the light, and the light emission state of the marker apparatus 3 is not put into the light emission state indicating that the light is seen within a fixed amount of time since the light was emitted by the light-emitting section 12, the receiving section 13 determines that a response is not confirmed, and the control section 14 outputs to the driving section 11 the control command that forcibly causes the moving body 1b to move to the last position recorded by the recording section 15. For this reason, the moving body 1b is forcibly returned to the last position where the supervisor was able to see the light emitted by the light-emitting section 12, and until the moving body 1b returns to that position, operations such as remote control by the operator or the like and autopilot may be disabled. Consequently, operations such as remote control by the operator or the like and autopilot become possible only in the case in which the moving body 1b is seen by the supervisor.

Note that although the present disclosure obviously is usable as a technology that disables operations such as remote control and autopilot in the case in which the operator or the like is unable to see the moving body being operated, but this usage example is merely one example of the usage of the present disclosure, and is not intended to limit the present disclosure. For example, the present disclosure may also be used as a more general technology for causing a moving body to execute predetermined behavior only in the case in which another party is able to confirm light emitted by the moving body, such as allowing the operated moving body to move only in the case in which the operator or the like is able to see the moving body, allowing the moving body to move away from a person other than the operator only in the case in which that person is able to see the moving body, causing the operated moving body to execute specific work only in the case in which another moving body rather than a person is able to confirm light emitted from the operated moving body, and the like.

The moving body, control method, and recording medium according to the present disclosure allow a moving body to be operated only in the case in which a person or the like is able to see the moving body, and thus are useful as a moving body that moves within visual range of a person or the like, as well as a control method and a recording medium storing a control program for such a moving body.

What is claimed is:

1. A moving body, comprising:
a drive that causes the moving body to move;
a light emitter that emits light, including a plurality of light emission patterns,
wherein each light emission pattern of the plurality of light emission patterns is associated with a predetermined operation;
a receiver that receives response information indicating that an operator who operates the moving body, an observer who observes the moving body, or a supervisor who supervises the moving body sees the light;
a detector that detects a position of the moving body;
a recorder that records the position of the moving body; and
a controller that,
when the receiver receives the response information within a fixed amount of time since the light emitter emitted the light, causes the recorder to record the position of the moving body detected by the detector, and
when the receiver records at least one position of the moving body and does not receive the response information within the fixed amount of time, outputs to the drive a control command from a set of predetermined commands, which includes
a first control command that causes the moving body to immediately move to a last position recorded by the recorder, and
a second control command that causes the moving body to move to the last position recorded by the recorder when the response information is received a predetermined number of times after the fixed amount of time has elapsed.

2. The moving body according to claim 1, wherein
the receiver determines that the response information is received in a case of receiving a response signal transmitted from a remote controller for remotely operating the moving body, and
the response signal is a signal that the operator transmits using the remote controller when the operator who operates the remote controller sees the light.

3. The moving body according to claim 2, wherein
the light emitter causes the light to be emitted in at least one light emission pattern selected from among the plurality of light emission patterns, and
the response signal is transmitted from the remote controller when the operator operates the remote controller by a predetermined operation associated with the at least one light emission pattern.

4. The moving body according to claim 2, wherein
the light emitter causes the light to be emitted in at least one light emission pattern selected from among the plurality of light emission patterns,
the remote controller transmits a response signal associated with the at least one light emission pattern, in accordance with a predetermined operation associated with the at least one light emission pattern by the operator, and
the receiver determines that the response information is received only when receiving the response signal associated with the at least one light emission pattern emitted by the light emitter.

5. The moving body according to claim 1, wherein
the receiver determines that the response information is received when receiving a response signal transmitted from an observation apparatus for observing the moving body, and
the response signal is a signal that the observer transmits using the observation apparatus when the observer who operates the observation apparatus sees the light.

6. The moving body according to claim 5, wherein
the light emitter causes the light to be emitted in at least one light emission pattern selected from among the plurality of light emission patterns, and
the response signal is transmitted from the observation apparatus when the observer operates the observation apparatus by a predetermined operation associated with the at least one light emission pattern.

7. The moving body according to claim 5, wherein
the light emitter causes the light to be emitted in at least one light emission pattern selected from among the plurality of light emission patterns, and
the observation apparatus transmits a response signal associated with the at least one light emission pattern, in accordance with a predetermined operation associated with the at least one light emission pattern by the observer, and
the receiver determines that the response information is received only when receiving the response signal associated with the at least one light emission pattern emitted by the light emitter.

8. The moving body according to claim 1, further comprising:
an imager that captures an image of a supervisor who supervises the moving body, wherein
the receiver determines that the response information is received in a case of acquiring, from the imager, image data in which the supervisor makes a predetermined gesture indicating that the light is seen.

9. The moving body according to claim 8, wherein
the light emitter causes the light to be emitted in at least one light emission pattern selected from among the plurality of light emission patterns, and
the receiver determines that the response information is received when acquiring, from the imager, the image data in which the supervisor makes a predetermined gesture associated with the at least one light emission pattern.

10. The moving body according to claim 8, wherein
the receiver identifies a person who makes a predetermined identifying gesture as the supervisor from image data acquired from the imager, and determines that the response information is received when acquiring, from the imager, the image data in which the identified person makes a predetermined gesture indicating that the light is seen.

11. The moving body according to claim 1, further comprising:
an imager that captures an image of a supervisor who wears a predetermined light-emitting apparatus and supervises the moving body, wherein
the receiver determines that the response information is received when acquiring, from the imager, image data in which a light emission state of the light-emitting apparatus is a predetermined light emission state indicating that the supervisor sees the light.

12. The moving body according to claim 11, wherein
the light emitter causes the light to be emitted in at least one light emission pattern selected from among the plurality of light emission patterns, and
the receiver determines that the response information is received when acquiring, from the imager, the image data in which the light emission state of the light-emitting apparatus is the predetermined light emission state associated with the at least one light emission pattern.

13. The moving body according to claim 11, wherein
the receiver identifies an apparatus of a predetermined identifying light emission state as the light-emitting apparatus from the image data acquired from the imager, and determines that the response information is received when acquiring, from the imager, the image data in which the light emission state of the identified light-emitting apparatus is the predetermined light emission state indicating that the supervisor sees the light.

14. The moving body according to claim 11, wherein
the light-emitting apparatus transmits a directional signal having a predetermined directionality,
the moving body further comprising:
a directional signal receiver that receives the directional signal, wherein
the receiver identifies an apparatus that transmits the directional signal to the directional signal receiver as the light-emitting apparatus, and determines that the response information is received in a case of acquiring, from the imager, the image data in which the light emission state of the identified light-emitting apparatus is the predetermined light emission state indicating that the supervisor sees the light.

15. The moving body according to claim 1, wherein
after the fixed amount of time elapses, the receiver judges that the response information is received in a period during which the light emitter is not emitting light, the controller outputs to the drive the control command that causes the moving body to move to the last position recorded by the recorder.

16. The moving body according to claim 1, wherein
the light is visible light.

17. The moving body according to claim 1, wherein
the moving body includes an unmanned air vehicle.

18. A control method of a moving body, the moving body including a drive that causes the moving body to move, a light emitter that emits light, including a plurality of light emission patterns where each light emission pattern of the plurality of light emission patterns is associated with a predetermined operation, a detector that detects a position of the moving body, and a recorder that records the position of the moving body, the control method comprising:
causing the detector to detect the position of the moving body; and
when the receiver receives first response information indicating that an operator who operates the moving body, an observer who observes the moving body, or a supervisor who supervises the moving body sees the light within a fixed amount of time since the light emitter emitted the light, causing the recorder to record the detected position of the moving body, and
after the detected position has been recorded and when second response information is not received within the fixed amount of time since the light emitter emitted the light, outputting to the drive a control command from a set of predetermined commands, which includes
a first control command that causes the moving body to immediately move to a last position recorded by the recorder, and
a second control command that causes the moving body to move to the last position recorded by the recorder when the second response information is received a predetermined number of times after the fixed amount of time has elapsed.

19. A non-transitory computer-readable recording medium storing a control program for causing a computer to function as a control apparatus of a moving body, the moving body including a drive that causes the moving body to move, a light emitter that emits light, including a plurality of light emission patterns where each light emission pattern of the plurality of light emission patterns is associated with a predetermined operation, a detector that detects a position of the moving body, and a recorder that records the position of the moving body,
the control program, when executed by the computer, causes the computer to execute a process comprising:
causing the detector to detect the position of the moving body; and
when the receiver receives response information indicating that an operator who operates the moving body, an observer who observes the moving body, or a supervisor who supervises the moving body sees the light within a fixed amount of time since the light emitter emitted the light, causing the recorder to record the detected position of the moving body, and
when at least one position of the moving body is recorded and the response information is not received within the fixed amount of time, outputting to the drive a control command from a set of predetermined commands, which includes
a first control command that causes the moving body to immediately move to a last position recorded by the recorder, and
a second control command that causes the moving body to move to the last position recorded by the recorder when the response information is received a predetermined number of times after the fixed amount of time has elapsed.

* * * * *